US012754061B2

(12) United States Patent
Hausmann et al.

(10) Patent No.: US 12,754,061 B2
(45) Date of Patent: Oct. 6, 2026

(54) WEIGHING SYSTEM, MANUFACTURING DEVICE AND METHOD OF OPERATING A MANUFACTURING DEVICE FOR WORKPIECES

(71) Applicant: Kiefel GmbH, Freilassing (DE)

(72) Inventors: Matthias Hausmann, Unken (AT); Florian Seehuber, Tittmoning (DE)

(73) Assignee: Kiefel GmbH, Freilassing (DE)

( * ) Notice: Subject to any disclaimer, the term of this patent is extended or adjusted under 35 U.S.C. 154(b) by 366 days.

(21) Appl. No.: 18/470,554

(22) Filed: Sep. 20, 2023

(65) Prior Publication Data

US 2024/0102845 A1 Mar. 28, 2024

(30) Foreign Application Priority Data

Sep. 22, 2022 (DE) ..................... 10 2022 124 331.1

(51) Int. Cl.
*G01G 11/00* (2006.01)

(52) U.S. Cl.
CPC .................................. *G01G 11/003* (2013.01)

(58) Field of Classification Search
CPC ............................. G01G 11/003; G01G 19/00
USPC ......................................................... 177/132
See application file for complete search history.

(56) References Cited

U.S. PATENT DOCUMENTS 4,241,560 A * 12/1980 Deimel et al. ............ B65B 7/04 53/373
4,755,124 A * 7/1988 Tanaka et al. ............ B29C 3/06 425/149
5,917,726 A * 6/1999 Pryor ............... G05B 19/41875 700/95
6,354,125 B1 * 3/2002 Bernelf et al. ......... B21D 26/02 72/60

(Continued)

FOREIGN PATENT DOCUMENTS

DE 198 50 304 A1 5/2000
DE 10 2019 127 557 A1 4/2021

(Continued)

OTHER PUBLICATIONS

German Search Report in Appl. No. 10 2022 124 331.1 mailed Jul. 12, 2023, 6 pages.

(Continued)

*Primary Examiner* — John E Breene
(74) *Attorney, Agent, or Firm* — Kowert, Hood, Munyon, Rankin & Goetzel, P.C.; Gareth M. Sampson; Dean M. Munyon

(57) ABSTRACT

The present disclosure relates to a weighing system for a manufacturing device for products, comprising at least one electronically evaluable scale, comprising at least one carrier element for positioning at least one workpiece or stack of workpieces, in particular a group of horizontally adjacent workpieces and/or stacks of workpieces, and an evaluation unit connected to the scale for receiving and evaluating detected weighing data, the scale being operable in coop- (Continued)

eration with the evaluation unit to detect the total weight and the horizontal weight distribution of at least one workpiece or stack of workpieces deposited on the carrier element. Further, the present disclosure includes a manufacturing system and an associated method.

19 Claims, 8 Drawing Sheets

(56) References Cited

U.S. PATENT DOCUMENTS

| | | | | |
|---|---|---|---|---|
| 8,920,698 | B2 * | 12/2014 | Sander | B29C 70/525 264/257 |
| 9,399,557 | B1 * | 7/2016 | Mishra et al. | B65G 43/00 700/213 |
| 10,152,879 | B2 * | 12/2018 | Chen | G08B 29/185 |
| 11,332,331 | B2 * | 5/2022 | Tanaka | D21B 1/32 |
| 2003/0111201 | A1 * | 6/2003 | Sato et al. | D21J 3/00 162/382 |
| 2008/0035390 | A1 * | 2/2008 | Wurz | G01G 11/00 702/156 |
| 2019/0384269 | A1 * | 12/2019 | Yen | G05B 19/4184 |
| 2024/0066807 | A1 * | 2/2024 | Blickle | B29C 64/393 |

FOREIGN PATENT DOCUMENTS

| | | | | | |
|---|---|---|---|---|---|
| DE | 102019127562 | A1 * | 4/2021 | D21J 1/04 |
| EP | 2171394 | A1 | 4/2010 | |
| WO | WO 2013028378 | A2 * | 2/2013 | |
| WO | WO 2021073672 | A1 * | 4/2021 | D21J 5/00 |

OTHER PUBLICATIONS

Extended European Search Report in Appl. No. 23192304.6 mailed Jan. 29, 2024, 7 pages.

* cited by examiner

WEIGHING SYSTEM, MANUFACTURING DEVICE AND METHOD OF OPERATING A MANUFACTURING DEVICE FOR WORKPIECES

PRIORITY CLAIM

The present application claims priority under 35 U.S.C. § 119 to German Patent Application No. DE 10 2022 124 331.1, filed Sep. 22, 2022, the disclosure of which is incorporated by reference herein in its entirety.

TECHNICAL FIELD

The present disclosure relates to a workpiece weighing system, a manufacturing device, and methods of operating a manufacturing device.

DESCRIPTION OF RELATED ART

In the prior art, processes and plants are known for the production of workpieces and products made of fiber material or with portions of fiber materials from a pulp.

For example, WO 2021/73674 A2 discloses such a manufacturing device having a preforming station for preforming, a preforming station for preforming, a hot forming station for final forming of a workpiece made of environmentally degradable fiber material in a fiber forming process.

A manufacturing device improved for this purpose and a manufacturing process are disclosed in WO 2021/073672 A1, in which the application of a functional layer or a layer system consisting of several functional layers and/or an application of a further layer of fiber material to a surface of the molded part to be coated is additionally carried out.

With these basically very suitable manufacturing devices and processes, it has been shown that it is sometimes very costly to ensure a defined quality of the products and workpieces, especially at high outputs.

SUMMARY OF DISCLOSED EMBODIMENTS

It is an objective of the present disclosure to propose a manufacturing device and manufacturing method improved with respect to the adjustability of quality of workpieces and products.

This objective may be solved according to the present disclosure by a weighing system, a manufacturing device and a method.

Advantageous embodiments are indicated in the respective, associated subclaims.

According to this, the objective is solved by a weighing system for a manufacturing device for products, including at least one electronically evaluable scale, including at least one carrier element for positioning at least one workpiece or stack of workpieces, in particular a group of horizontally adjacent workpieces and/or stacks of workpieces, and an evaluation unit connected to the scale, for receiving and evaluating detected weighing data. Here, the scale is designed in cooperation with the evaluation unit to record the total weight and the horizontal weight distribution of at least one workpiece or stack of workpieces placed on the carrier element.

The evaluation unit can advantageously be an evaluation unit integrated in the scale and, if required, include data memories and/or be connected to at least one data memory. Furthermore, the evaluation unit can be connected to a control unit for the manufacturing device or be an integral part of the control device of the manufacturing device. Furthermore, the evaluation unit may include common (micro-)electronic components required for operation and measurement value conversion and/or processing, such as analog-to-digital converters, processor units, interface units to adjacent local or mobile receiving units and/or communication networks, in particular to a control unit.

In particular, the support element can be designed as a plate or shell. In one embodiment, the carrier element may include and/or be connected to a carrier structure, frame, or the like that receives the carrier element.

Furthermore, the term "workpiece" is not to be understood restrictively and means any preliminary or final stage of a product manufactured by means of the manufacturing device in a single-stage or multi-stage forming process, so that in an analogous manner a product is a workpiece in its final manufacturing stage.

In an advantageous embodiment, it may be provided that the carrier element is formed from two or more individual carrier elements.

Although the term "a workpiece" is often used for simplification purposes, it is also intended to refer to a group of two or more workpieces, unless otherwise specified. Overall, it is advantageous if a plurality of workpieces are simultaneously formed, acted upon and/or sensed during all treatment steps.

An advantage for the weighing system can be that the scale, in cooperation with the evaluation unit, is designed to detect the respective individual weight of at least two workpieces and/or workpiece stacks adjacent to each other as weight distribution.

Here, the weight distribution and the individual weights are recorded by determining the actual center of gravity and/or the vector of the actual center of gravity displacement to a theoretical target center of gravity or target vector of a theoretical, expected center of gravity displacement.

Advantageously, in one embodiment, it can be provided that the scale has one or two carrier columns which directly or indirectly support the carrier element for the deposit and which have at least one torsion sensor and/or are connected thereto, in particular have two or more torsion sensors, for at least partial determination of the weight distribution.

The carrier columns are advantageously rigidly connected to the carrier element, so that a shift in the center of gravity on the carrier element leads to the introduction of a measurable bending moment on the carrier column and/or in the carrier element, the corresponding bending moments being detected by means of suitable sensors.

If more than two carrier columns are provided, they are advantageously aligned in an alley or row so that a measurable bending moment can be formed in most of the partial surfaces of the carrier element.

In a further improved embodiment, it can be provided that the scale has at least three support elements for the carrier element, wherein the support elements have or represent force measurement sensors, wherein the at least three support elements are connected to the carrier element in a contact pattern with three contact points that are not in a row, and wherein the at least three support elements and/or their force measurement sensors are designed to send measured values to the evaluation unit, which determines the total weight and the weight distribution based thereon.

The contact pattern is formed by the support or contact points of the support elements with the carrier element and the area enclosed thereby. In the simplest case, this is a non-rigid connection, a triangle or a quadrilateral, where the polygonal designation is not to be understood restrictively in the mathematical sense. A "corner" of this contact pattern can be equated, for example, with the support surface of a support element.

In a further improved embodiment, it can be provided that the weighing system and/or the evaluation unit includes at least one input interface for receiving sensor data and/or production data, wherein:

- the sensor data include in particular recorded geometric measured values and
- the production data in particular defined nominal values of the at least one workpiece or the at least one workpiece stack.

Thus, the weighing system ideally includes a sensor unit.

Advantageously, the sensor that detects the geometry of the workpiece is a sensor that detects a two-dimensional shadow area of the workpiece and/or the workpiece stack, such as a CCD camera, a line scan camera, etc., or that detects a topography of the workpiece and/or the workpiece stack, such as a 3D laser scanner. Furthermore, an advantage may be to provide at least one sensor detecting a target value of the workpiece, which detects at least one further material value, such as a heat sensor, a humidity sensor, a radiation sensor and/or a light sensor, etc.

In order to be able to derive conclusions from the weighing data for the manufacturing process and the manufacturing device, it is advantageous to evaluate the weighing data. This can be done, as described above, by using a sensor unit in which different quantities are detected from the mass of the workpieces. Because the masses determined from the weighing data of the scale are of central importance for the evaluation of the workpieces and the control of the manufacturing process and the manufacturing method, in a further improved embodiment of the weighing system it can be provided that a further scale is included which is connected to the evaluation unit. In particular, this should be another scale that has the following to the first scale:

- a different arrangement of the at least one carrier column or a different contact pattern of the support elements or
- instead of the at least one carrier column of the first scale, at least three support elements in one contact pattern.

Here, the connections to one or the same evaluation unit and/or other elements are to be provided in an analogous manner, in particular a sensor unit as described above. In other words, it may be advantageous if the second scale differs from the first scale in terms of the type of scale and/or the type of structure with respect to the contact pattern of the contact points and/or the arrangement of the carrier columns.

Thus, a different contact pattern can be used to achieve a changed resolution of the position of the actual center of gravity and thus verify the real actual center of gravity and/or the load distribution on the individual carrier columns or support elements.

A further improvement of the weighing system may include, in a further embodiment, providing that the at least one scale is integrated into a conveyor unit, wherein the conveyor unit:

- includes a conveyor belt as conveying means, the scale being integrated into the conveyor belt in such a manner that the carrier element is covered by at least one belt layer and/or
- includes a conveying means by means of which the scale can be at least partially transported, in particular a transport robot or a linear drive, in particular an electromagnetic linear drive.

If the scale is integrated into a conveyor unit, it can be advantageous if the at least one carrier element is only covered or swept by one belt layer. Particularly with very light workpieces, whose weight is considerably less than the weight of the carrier element, it has been found that the influence of the belt position strongly affects the weighing data, with this inclusion decreasing as the weight of the workpieces or workpiece stacks increases. Thus, it can be advantageous if the belt tension and the belt drive are controllable, so that the belt of the conveyor unit can be relaxed during the weighing step and/or stopped for a short time while weighing is taking place.

In an alternative embodiment, it may be advantageous for the carrier element to be a mounting structure attached to the frame of a scale conveyor associated with the scale. This weighing conveyor is ideally integrated into the conveyor unit. In this embodiment, the scale conveyor and the mounting structure are detected as the tare. Furthermore, in this embodiment it makes sense to tension the belt of the weighing conveyor very strongly and/or to provide a very inflexible belt material in order to minimize the deformation in the belt material which cannot be measured by means of the scale.

In a further advantageous embodiment, it can be provided that the scale includes at least two drivable carrier elements in the form of rollers, in particular rollers equipped with or forming a tubular motor. In this case, the rollers are arranged on at least one side on at least one support element, so that the weight and/or the weight profile of the workpieces can be detected when they are supported on a roller, in particular when they are passed over. This embodiment can be improved by having a plurality of drivable rollers forming the carrier element, each of which is arranged on both sides of a support element. The support elements are connected to the evaluation unit, which is equipped to determine the weight of a single workpiece and/or the actual center of gravity of at least one workpiece and/or at least one workpiece stack from the individual weighing data of the evaluation units.

In particular, the evaluation unit is equipped to determine the actual center of gravity of a group of workpieces and/or workpiece stacks arranged horizontally to one another from the individual weighing data of the evaluation units.

In a further improved embodiment, it may be provided that the at least one scale:

- is designed as a dynamic scale and includes corresponding components in order to carry out a dynamic measurement, the workpieces being conveyed relative to the scale during the measurement, and/or
- is designed as a static scale and includes corresponding components in order to carry out a static measurement, the workpieces being positioned relative to the scale during the measurement and not being conveyed in order to carry out a static measurement.

In other words, dynamic weighing is understood to be a weighing step in which the workpieces are moved simultaneously and, in particular, have a speed relative to the scale, the support elements and/or the carrier columns. Similarly, static weighing is understood to mean a weighing step in which the workpieces are at rest at the same time and, in particular, do not have any relative speed with respect to the scale, the support elements and/or the carrier columns. Thus, a weighing step in which the workpieces are transported in parallel with the scale constitutes a special form of static weighing.

In a further improved embodiment, it can be provided that:

- at least one support element is mounted so as to be displaceable relative to the carrier element, is advantageously drivable, in particular is motor-drivable, and/or the carrier is mounted so as to be displaceable relative to at least one support element, is advantageously drivable, in particular is motor-drivable.

By changing the position of the support elements relative to the carrier element, the nominal center of gravity is changed in a defined manner and a first measurement adapted to the workpieces or workpiece stacks and/or a controlling further measuring step can be carried out. Particularly in the case of very light workpieces and/or when depositing the first group or position of workpieces that are subsequently covered because a stack is formed, it can be advantageous to redundantly monitor the center of gravity position and/or weight distribution at an early stage. This can be done alone or in combination with other measured variables.

It can be advantageous here if a linear guide is arranged between the carrier element and the free end of the support element, in which the free end of the support element can be guided. In particular, it can be advantageous if the carrier element has at least one linear guide on its side facing the support elements, in which the free end of at least one support element is displaceably mounted. The linear guide is not to be understood restrictively here and can be a line of any shape, in particular with at least one straight and/or curved line section.

In a further improved embodiment, it may be provided that the at least one scale is arranged on or formed by an electromagnetic direct drive having at least one drive rail and at least two independently drivable and controllable movers.

The drive rail of the direct drive is aligned in particular as a drive oval on which the movers can circulate endlessly. Ideally, the drive oval has a straight, short-free measuring section (forward run), two deflections and a return section (return run). The measuring section is defined in particular by the fact that the weighing step can be carried out there, irrespective of the conveying speed and conveying direction during the measuring step.

In a further improvement of this embodiment, it may be provided that:

at least a first mover or a first drive unit has at least one support element, and at least one further mover or drive unit has at least one further support element.

It is particularly advantageous if two pairs of movers are provided, i.e. a total of four movers, each with a support element that can be driven by one another, form the scale and carry the carrier element in a defined manner. If the carrier element has a linear guide on the underside on at least one side, the relative position of the support elements to one another can be changed and thus the nominal center of gravity can be changed in a defined manner. In other words, a change in the nominal center of gravity and thus in the resolution of the actual center of gravity relative to the nominal center of gravity can be caused via the approach or the spacing of the support elements to one another.

In a further improved embodiment, it may be provided that at least one support element may be inactivated and/or vertically removed from the respective contact point.

Here, contactless means that the contact between the support element and the carrier element is released and these two elements are spaced apart at least briefly. This also makes it possible to vary the nominal center of gravity and thus verify the actual center of gravity for more than three support elements.

Even if the determination of a "center of gravity" is primarily referred to in the present context, this is intended to be synonymous with the "determination of the weight proportions" on individual support columns and/or on individual support elements, because the "center of gravity" (nominal center of gravity and/or actual center of gravity) is derived from this. In particular, the nominal center of gravity can be a theoretically defined data set or value to be expected under ideal conditions.

Furthermore, the present disclosure describes a manufacturing device for workpieces including a material feed unit, a forming unit and a rejection unit, wherein the forming unit has at least one forming station with at least one forming tool and at least one pressing device, wherein the at least one forming tool is held on the pressing device and can be moved by the latter in a motor-driven manner, and wherein at least one control unit is provided, by means of which at least one unit and/or one device can be controlled and/or regulated. Here, advantageously, a weighing system for determining weighing data of at least one workpiece and/or at least one stack of workpieces according to one of the above embodiments and variants is described, wherein the weighing system is arranged in particular in the forming unit and/or after the forming unit.

The manufacturing device may further include a material feed unit for feedstocks such as a fiber-containing pulp or other consumables. This material feed unit is advantageously connected to a supply unit and/or a feed unit. Advantageously, the pressing device has supporting and fastening elements for at least one forming tool, which in particular can be a heated forming tool.

Here, "aggregate" means any controllable component and "device" means any actuator and/or sensor, wherein a "device" can also be an "aggregate".

The manufacturing device is designed and has corresponding means for releasing workpieces on a molded part, in particular blowing them out by means of compressed air. In particular, there is an advantage in that the forming tool and/or a device holding and/or driving the forming tool is designed to position a workpiece or a group of workpieces from the forming tool directly on the scale, in particular on the carrier element.

In an improved embodiment of the manufacturing device, it can be provided that the at least one forming station and/or the at least one forming tool thereof:

is designed for the press forming of workpieces from a starting material and/or is designed for the pressing and hot forming of workpieces from a starting material and/or a preform of a workpiece, in particular includes two forming stations each having at least one forming tool.

Furthermore, a preforming station may be provided upstream of the first forming station, including a motion unit, such as an articulated robot, with a suction tool. The suction tool is designed and movable so that the provided free-flowing starting material can be sucked in and a preform of the workpiece can be formed. This preform, which usually has a very high moisture content, is subsequently further formed in a forming station.

Furthermore, it can be advantageous if a finishing unit for the workpieces and/or stacks of workpieces is provided after the forming station, in particular after the second forming station, which is advantageously designed as a hot forming station. The converting unit may include a cutting station, a coating station, a stacking station, and/or a packaging station. In this case, the workpieces are finished in the cutting station by removing material, and a gas- and/or liquidretardant coating is applied in the coating station, in particular on the inside of the workpieces on at least one partial surface.

In a further improved embodiment, it may be provided that the weighing system includes a scale having downstream of the at least one forming tool for press-forming workpieces and, in particular, arranged downstream of the forming tool for press-forming and hot-forming workpieces.

Here, “downstream” also means that the scale can be integrated into the forming tool and can perform the weighing step after forming in the associated forming tool.

In a further improved embodiment, it can be provided that the evaluation unit and the control unit are connected in a data-conducting manner and are functionally designed in such a manner, in particular use corresponding software programs, so that the control unit can control and/or regulate at least one unit and/or one device at least temporarily based on the weighing data obtained by the evaluation unit, in particular evaluated weighing data (evaluation data), in particular at least one unit and/or one device can be controlled and/or regulated upstream of the scale at least temporarily.

Here, “evaluation data” is to be understood as any data that the evaluation unit forwards and/or stores after evaluation. Evaluation data can consist in particular of a selection of weighing data, parameters or characteristic curves for the control of aggregates or actuators, in particular aggregates and actuators arranged upstream of the scale. Furthermore, evaluation data can also include data relating to supplementary and/or modified acquisition by means of sensors, for example in order to verify weighing data and/or other measurement data.

In particular, the evaluation data can be determined and processed using AI-based software (artificial intelligence), especially by considering other measured values and measurement data together.

Evaluation data may also relate to data representing a warning and signal indication, if applicable, in a display monitor (HMI) and/or emitted by another signal generator, such as a lamp, an LED display, and/or a sound emitter.

In a further improved embodiment, it can be provided that at least one forming station and/or at least one forming tool is designed to form a group of two or more workpieces and includes and/or is designed to discharge and/or hold individual workpieces and/or groups of workpieces in a controlled manner, in particular to discharge them directly onto the scale and/or the supporting element of the scale.

As a release means, the suction mold and/or the forming mold can, for example, have internal channels or chambers which can be subjected to a vacuum and/or a pressure pulse in a controlled manner, either individually or as a subgroup. In this manner, workpieces can be ejected and deposited with a time delay. In this case, the suction tool and/or the forming tool and the associated internal channels and chambers are designed and can be controlled in such a manner that workpieces can be discharged in rows, columns or partial groups.

Advantageously, the workpieces of a row, column or subgroup are then weighed one after the other until the entire group that can accommodate a tool is completely deposited and weighed.

Further, the present disclosure describes a method of operating a manufacturing device including the steps of:

- provisioning of a starting material,
- introducing a starting material into a forming unit, the forming unit having at least one forming station with at least one forming tool and at least one pressing device, ideally two pressing devices, and
- forming at least one workpiece, in particular a group of workpieces, by means of the forming tool.

Here, downstream of the forming station, the total weight and the horizontal weight distribution of at least one workpiece or workpiece stack positioned on the carrier element are detected by means of a scale of a weighing system in a weighing step, in particular a group of two or more positioned workpieces or workpiece stacks is detected.

Here, the starting material is supplied as flowable or free-flowing material and made available, for example, in an open feed container for a suction mold for preforming.

In an improved embodiment, it is provided that the workpiece is positioned directly on the scale by the forming tool and/or the pressing device. Ejecting a workpiece from a mold can be done in any suitable manner, in particular via at least one gas pressure pulse, i.e. blowing out the workpieces. In an improved process version, the workpieces in a group of workpieces are not all ejected at the same time, but are ejected as rows, columns or subgroups. For this purpose, for example, a pressure pulse can be applied to only a number of the workpieces and/or another subgroup, which is not yet to be ejected, can be held in the mold by introducing a vacuum.

In an improved process variant, it can be provided that after the joint forming of a group of two or more workpieces, a stepwise weighing for a number (subgroup) of workpiece layers greater than or equal to 2 is carried out, in particular a layer-by-layer weighing of the workpieces is carried out.

There may be a further advantage in having the group of workpieces that a die can accommodate simultaneously ejected in only one row or column of workpieces in sequence, stacked, and weighed after each ejection. In other words, from each group of workpieces consisting of n rows and m columns that a tool can hold at maximum simultaneously, on the support element of the scale:

- only one line with n layers or
- only one column with m layers is formed.

In the present context, “row” is understood to mean a subgroup or row of adjacent workpieces or positions for workpieces which is oriented transversely to the main transport direction and, in an analogous manner, “column” is understood to mean a subgroup or row of workpieces or positions for workpieces which is formed parallel to the main transport direction.

The great advantage of this is that it is very easy to differentiate between the individual workpiece positions of a mold if a positioned subgroup of workpieces has a weight or weight distribution that differs from that of other subgroups.

It is obvious to the skilled person that these process variants can not only be carried out line-by-line or column-by-column, but that combinations are also conceivable. If a total stack to be formed on the scale consists of n rows, m columns and k layers, a partial stack of n rows and m columns and k−3 layers could be formed line by line in the first weighing steps and then the last 3 layers of the total stack could be positioned one after the other column by column and weighed individually.

This process variant can also be carried out in an analogous manner for partial groups of workpieces that are not ejected line by line or column by column and positioned on the support element of the scale.

A further improvement of the method may be that after a group of two or more workpieces has been formed together, multiple weighing is performed before a next forming of a next group of workpieces by independently weighing a partial number of workpieces of the jointly formed group in partial weightings.

A process analogous to stepwise weighing can be used here, in particular the ejection of subgroups from workpieces from a forming die and positioning on the carrier element.

A further improvement of the method can be that the weighing step takes place after the first forming and a further forming.

Thus, at least one scale is arranged between a preforming station and a first forming station and/or a first forming station and a downstream second forming station for workpieces.

A further improvement of the method may consist in that weighing data are determined in the weighing step and are transmitted to an evaluation unit, wherein the evaluation unit transmits the weighing data, in particular the evaluation data, to a control unit and based thereon at least:

an aggregate and/or a device is at least temporarily controlled and/or regulated and/or an information and/or warning signal is sent to an output unit, in particular an HMI, an optical or acoustic signal transmitter.

Here, "based" means that this weighing data or evaluation data is used alone or in addition to the control, which can take place immediately or with a time delay. Furthermore, the control is carried out with the integration of target values, in particular algorithms, value tables and/or an AI.

Overall, it may be advantageous if the weighing system is designed according to one of the above embodiments and embodiment variants. It may also be advantageous overall if methods are used for a manufacturing device formed according to one of the above embodiments and embodiments.

All advantages, aspects and features as well as combinations of features mentioned above for one category, such as the weighing system, the manufacturing device or the (manufacturing) process, shall apply in an analogous way also to the (one) other category in each case, if it is not technically impossible.

Furthermore, no distinction is to be made between measured values and measured data, and these terms are to be used synonymously unless otherwise specified, since it is known to the person skilled in the art how processed measured data, in particular digital measured data, can be derived from the raw and possibly analog measured values of a sensor, for example, and furthermore the type and scope of the measured values and measured data transmitted by a sensor depends on the design and functional scope of a sensor.

Further details and advantages of the disclosed embodiments will now be explained in more detail with reference to an example embodiment shown in the drawings.

DETAILED DESCRIPTION

Figure 1:
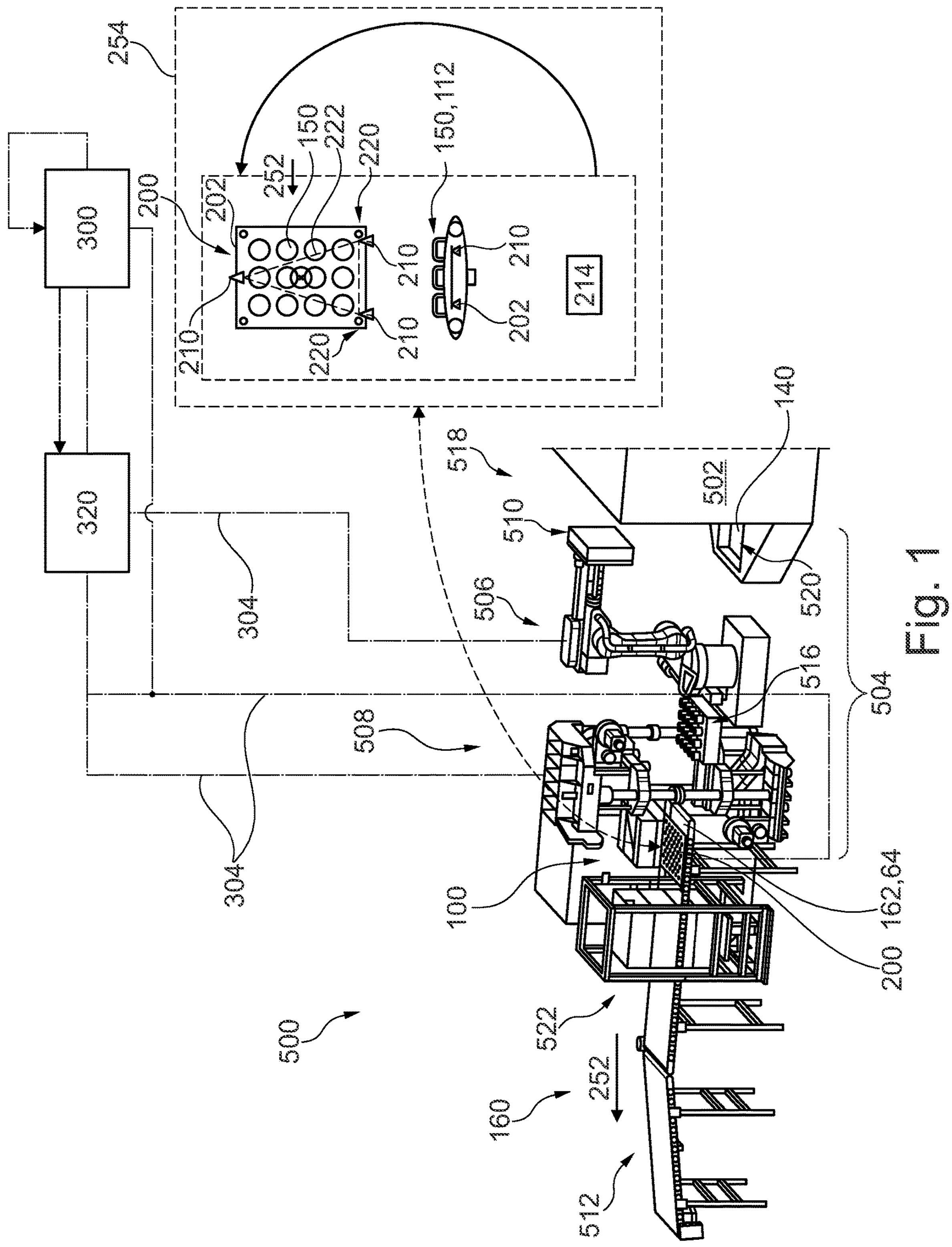
FIG. 1 shows a schematic view of a manufacturing device with the weighing system.

FIG. 1 shows by way of example of a schematic structure of a manufacturing device 500 for manufacturing workpieces 150 from a fiber material. Here, the weighing system 100 is shown in context and a possible installation position in a manufacturing device 500 downstream of a second forming station 508.

The manufacturing device 500 includes a material feed unit 502, a preform station 518, a first forming station 506, a second forming station 508, a finishing unit 522, and a rejection unit 512. A feed tank 520 is included as part of the preform station 518. The first forming station 506 includes a motion unit 524, designed as a multi-axis robot, on which a suction tool 510 preforming the workpieces is arranged and guided. The finishing unit 522 may include one or more functions and corresponding stations as needed, such as coating, cutting, stacking, and/or packaging. Furthermore, a rejection unit 512 is provided. The material feed unit 502 forms a production line with the forming unit 504 and the finishing unit 522, wherein the rejection unit 512 connects or connects downstream to the scale 200 of the weighing system 100, second forming station 508 and the finishing unit 522, for discharging the workpieces in the respective batch sizes and/or packaging units.

The scale 200 of the weighing system 100 is part of a conveyor unit 160 and is structurally integrated with the conveyor 162, which in the example embodiment shown is an endless circulating conveyor 164. The carrier element 202 rests on three support elements 210, as shown in the left detailed illustration, and is covered by a layer of tape 166. Thus, in the weighing step, the workpieces 150 or stacks of workpieces 152 are weighed together with the portion of the layer of tape 166 that rests on the carrier element 202. Connected to the conveyor 162 is the finishing unit 522 or the rejection unit 512.

The scale 200 is connected in a data-conducting manner to the evaluation unit 300 and the control unit 320, which is shown by the dash-dotted lines outlined as data lines 304. The data lines 304 may be multi-core. In particular, the data lines 304 may be combined data and power lines, such as in an IO-Link or SPE with DoPL (Single Pair Ethernet with Data over Powerline). The control unit 320 is connected to other aggregates and devices, as outlined by dash-dotted lines.

For preforming workpieces 150, the suction tool 510 is lowered into the feed tank 520 filled with a pulp containing fiber material as an aqueous phase, and a defined layer of moist fiber material is sucked to the contour of the screen-like suction tool 510 by means of the vacuum pump 142. A pressure sensor can be provided in the line between the vacuum pump 142 and the suction tool 510, via which the pressure in the suction line and, via this, also the degree of contamination of the suction tool 510 can be detected, in particular in the synopsis and correlation with the line pickup of the vacuum pump 142, which can be detected via an integrated sensor. Subsequently, this defined layer is dewatered and precompressed in the first forming station 506. This is done at a temperature in the range of 30° C. to 80° C. and a pressure in the range of 0.2 $N/mm^2$ to 0.3 $N/mm^2$. Subsequently, after transfer of the preformed workpieces into a hot press tool 134 of the second forming station 508, the final forming of the workpieces 150 takes place. This second forming station 508 is designed here as a main or hot forming station.

Forming in the second forming station 508 takes place at a (main) pressure in the range from 0.5 N/mm$^2$ to 2.0 N/mm$^2$ and a temperature of 100° C. to 250° C. This method is known in principle. In a variant of the process not shown, the final forming of the workpieces is carried out in a single hot and pressing step, which is, however, generally very costly in terms of energy.

The control unit 320 has a controlling and regulating effect on the manufacturing device in a manner not shown in detail and receives, also in a known manner, measurement and/or status data from the aggregates, actuators and the sensors and sensor units and evaluates them. This reception and evaluation of measurement and status data may be performed in parallel with the reception and evaluation of measurement and status data from the evaluation unit 300.

As can be seen in the left detailed drawing, the carrier element 202 of the scale 200 is arranged on three support elements 210, whose three contact points 220 with the support element form a triangular contact pattern 222. The main transport direction is from right to left in the image plane, so that the group of workpieces forms an arrangement of 3 rows and 4 columns, corresponding to the 12 forming elements of the associated forming tool 516. By the distribution of weight among the three support elements 210 and/or the position of the actual center of gravity 238 relative to the target center of gravity 236, the weight of an individual workpiece 150 can be estimated or specifically determined, as will be further detailed in particular in the figures below.

As can further be seen in the left detailed view, the control loop 254 includes weighing the group of workpieces 150, weighing from position on workpieces 150 already weighed, if necessary, and subsequently referencing 214. The referencing 214 consists of the formation of the tare and/or a zero value formation of the already loaded carrier element. The next group of workpieces 150 is then positioned and weighed until the final height of the workpiece stacks 152 with the desired number of layers is reached. This is followed by rejection by the rejection unit 512 and/or transfer to the finishing unit 522.

Figure 2:
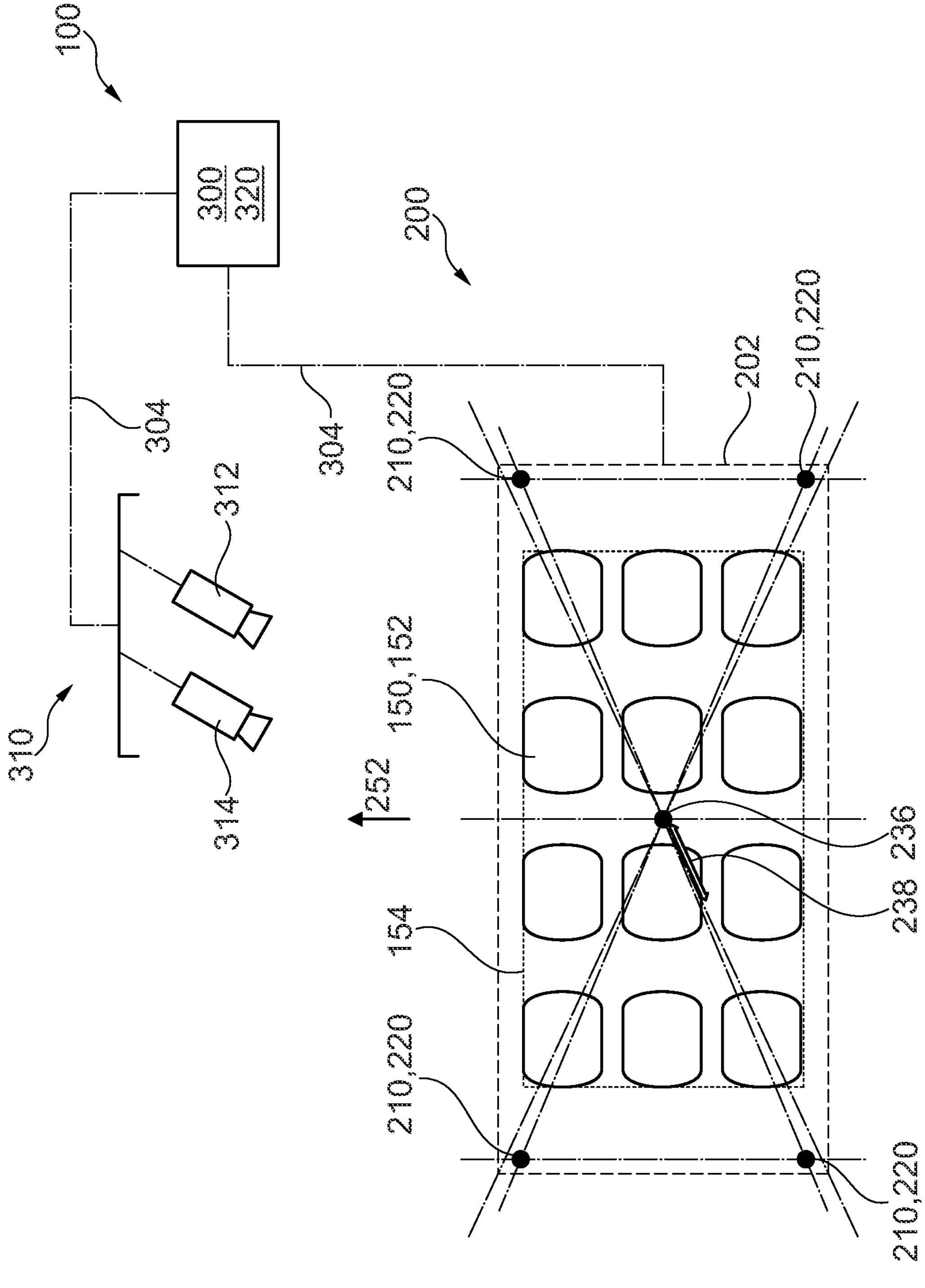
FIG. 2 shows the weighing system in a first embodiment.

FIG. 2 schematically shows the scale 200 in a top view of the carrier element 202. The carrier element 202 is arranged on four support elements 210, which form a rectangle as a contact pattern 222. There are also 12 workpieces 150 positioned on the carrier element 202, which form the group of workpieces 150 including 3 rows and 4 columns due to the main transport direction 252.

Due to the geometry of the carrier element 202 as a rectangular plate and the symmetrical support of the support element 202 on the four support elements 210 and due to the ideal, symmetrical positioning of the 12 workpieces 150, the target center of gravity 236 in a weighing step is in the center of the carrier element 202, i.e. at the intersection of the diagonals of the support element and/or the connecting lines of the contact points 220, since the contact points 220 are also symmetrically distributed below the carrier element 202.

As soon as at least one workpiece 150 has a different weight than the other workpieces 150, the weight distribution at the four support elements 210 changes and thus also the resulting actual center of gravity 238, which in the present case always means the actual center of gravity position. For example, in the embodiment shown, the total weight of the group of workpieces 150 has decreased and the actual center of gravity 238 has shifted downward along the diagonal to the left. Thus, it can be concluded that the workpiece 150 in the upper right corner has too little material. Since the workpieces 150 are preformed in discrete sections of the suction tool 510, it can be concluded with high statistical probability that the workpiece 150 in the upper right corner is lighter by substantially this amount of weight. Furthermore, it can be concluded from this with a high degree of probability that there is increased contamination in this area of the suction tool 510.

Similarly, the position of the actual center of gravity 238 relative to the expected target center of gravity 236 can be used to derive a variety of estimates relating to the weight of individual workpieces 150 and also to the condition of individual tools and/or process parameters.

For example, if the total weight of the group increases over time, i.e., the total weight of a group relative to previous groups of workpieces, it can be concluded that either the dewatering in the first forming station 506 is not of the desired quality and/or the heating line in the second forming station 508 is deficient. From the gradient of change, it can further be deduced whether the manufacturing process and thus the manufacturing device must be stopped immediately or whether continued production under possibly adapted conditions, such as extended treatment in one or both forming stations, is sufficient until a desired batch of workpieces is completed, if necessary, and the manufacturing device is subjected to a routine cleaning process.

In FIG. 2, a sensor unit 310 is further included that includes two sensors 312, 314. This sensor unit 310 or the two sensors 312, 314 are connected to the evaluation unit 300 and/or the control unit 320 in a data-conducting manner.

In the example shown, the first sensor 312 is a 3D laser scanner by means of which the topology of the workpiece 150 can be detected and/or the surface roughness or surface flatness can be detected. These measured values provide information in particular, but not exclusively, about the mechanical influences caused by the previous tools. The second sensor 314 is a thermal imaging camera, the measured values of which provide information in particular, but not exclusively, about the area-wise heating power of the second forming station 508 and the forming tools 516 there. From these measured values, for example, estimates can be derived in the joint show with the electrical power taken off for the heating and, if necessary, characteristic progressions, as to whether there is a high degree of contamination in the tool 516, so that the entire amount of heat is no longer transferred into the workpiece 150.

Figure 3:
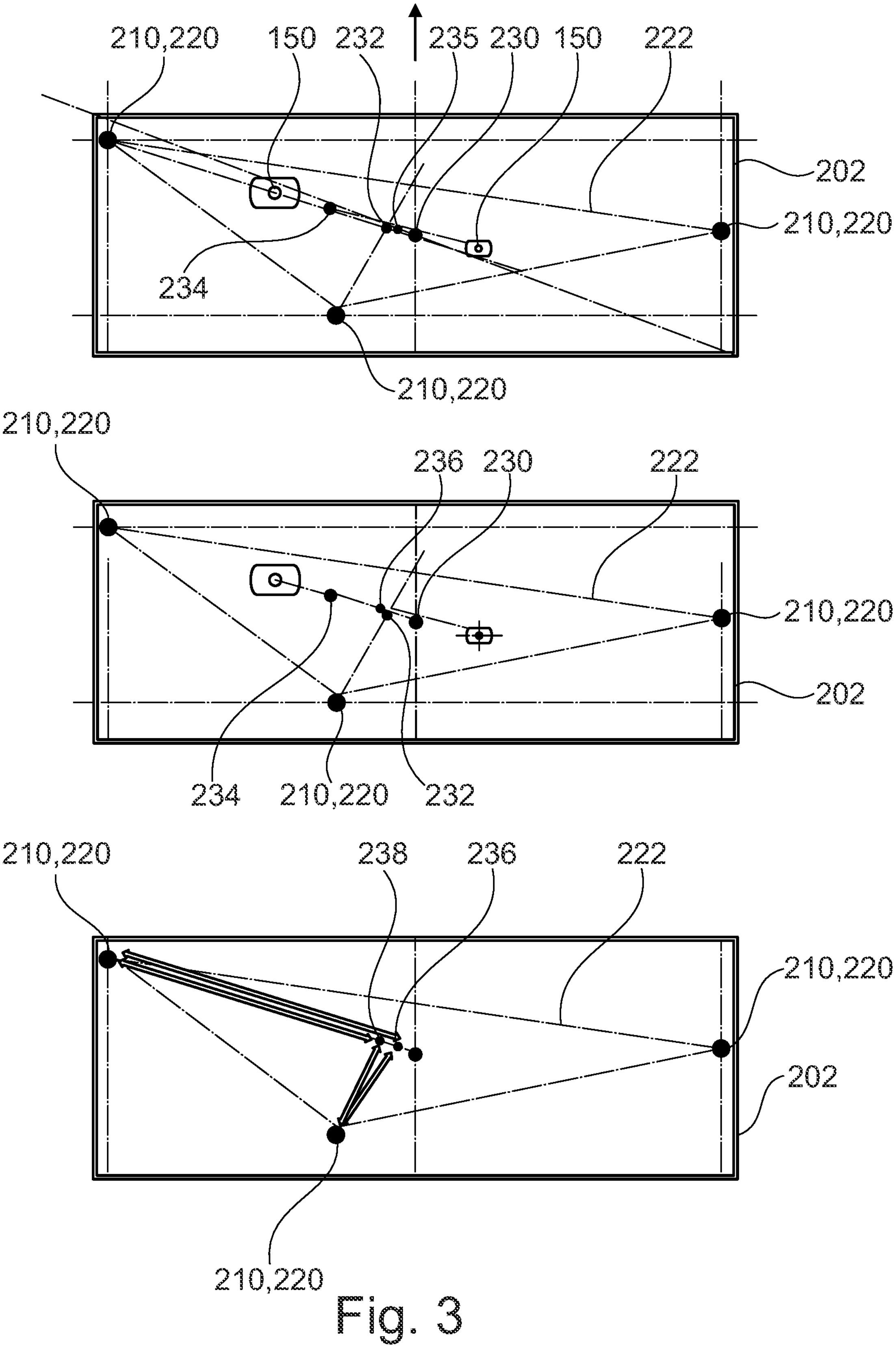
FIG. 3 shows the weighing system in a second embodiment.

In FIG. 3, the position of the different centers of gravity on the carrier element 202 of the scale 200 is shown in three partial images, whereby two workpieces 150 of very unequal size and thus correspondingly different weights are placed on the scale for illustration purposes, which are formed from the same starting material. The rectangular carrier element 202 has a center of gravity 230 located at the intersection of the diagonals and/or the intersection of the centerlines of the sides. In the example shown, the contact points 220 form an arbitrary triangle as a contact pattern 222, the center of gravity 232 of which lies in a known manner at the intersection of the distances extending from the centers of the sides to the respective opposite corners.

Thus, a resulting center of gravity 235 from the carrier element 202 and the triangular contact pattern 222, which lies on the connecting path of these two centers of gravity, is the theoretical desired center of gravity for an empty carrier element 202, as shown in the upper partial image of FIG. 3.

In the top and middle partial images, it is further shown that the group consisting of the two workpieces 150 has a common center of gravity 234 that is located on the connecting path between the centers of gravity of the individual workpieces 150 and is located significantly closer adjacent to the left, larger workpiece 150.

Finally, the target center of gravity 236, which results after the ideal positioning of the ideally weighted workpieces 150 on the carrier element 202, is located on the connecting path between the resulting center of gravity 235 and the center of gravity 234 of the group of workpieces 150, as shown in the middle partial image.

As shown in the lower partial figure, the target center of gravity 236 results from the weight fractions, shown as double arrows, measured by the support elements 210 at the three contact points 220. The weight percentage correlates with the length of the respective double arrow. If, for example, the larger workpiece 150 has a larger mass and/or the smaller workpiece 150 has too small a mass, the detected actual center of gravity 238 shifts in the direction of the larger workpiece 150, the case shown in the lower partial image. From the total weight and the position of the actual center of gravity 238, the weight of both workpieces 150 can be unambiguously determined for these two workpieces 150.

Figure 4:
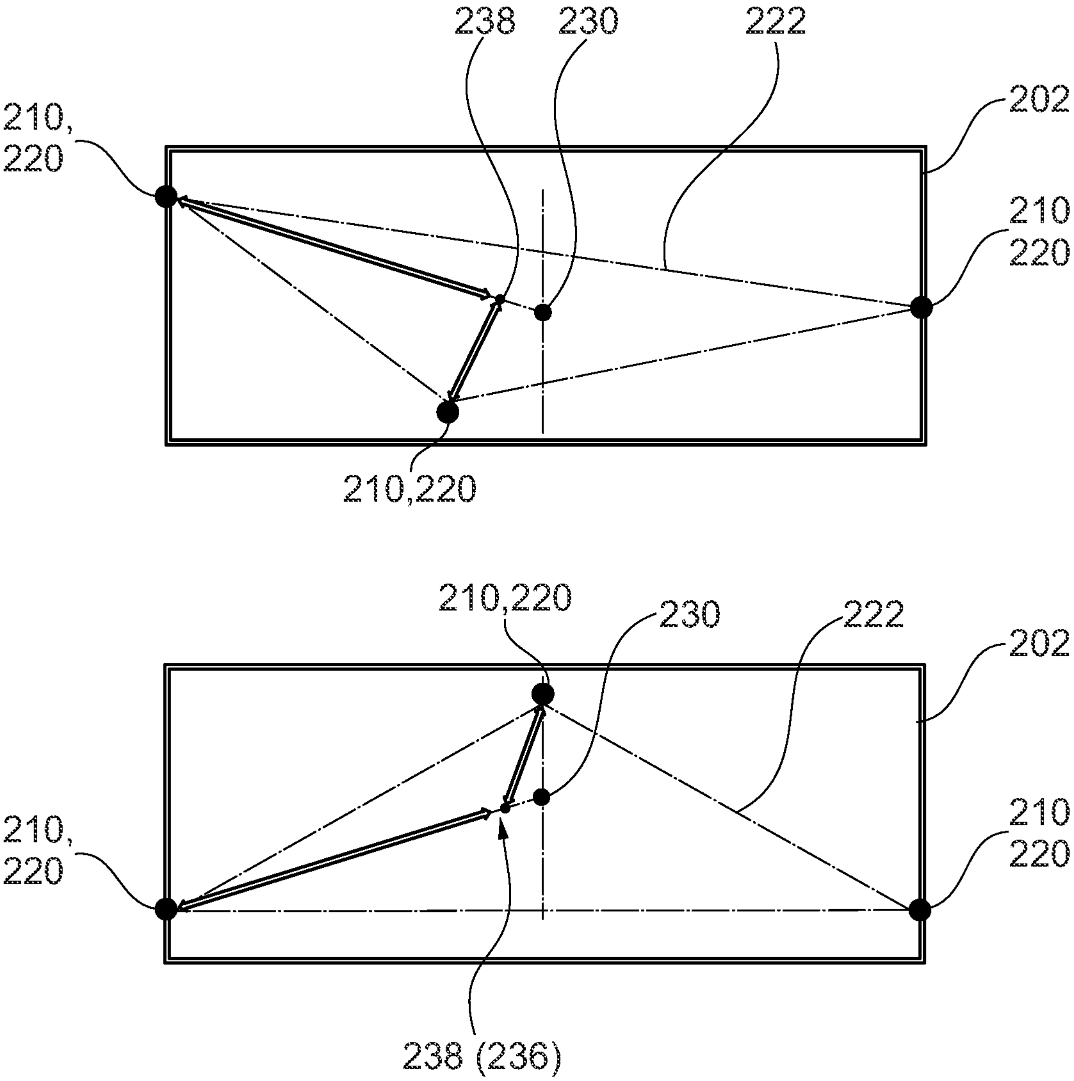
FIG. 4 shows the weighing system in a third embodiment.

In FIG. 4, an arrangement identical to FIG. 3 is shown in the upper partial image, although not all centers of gravity are shown, only the center of gravity 230 of the carrier element 202 and the measured actual center of gravity 238, which results from the measured weight proportions of the three support elements 210. In the lower partial image, the carrier element 202 has been rotated 180° and the three support elements 210 of the scale 200 or another scale 200 have been arranged as an equilateral triangle. Thus, in a further measuring step, a check of the previous measurement can be carried out, because with the known, identical total weight of the two workpieces 150 and the determined actual center of gravity 238, a second nominal center of gravity 236 based on the measured actual center of gravity 234 from the first measuring step is available for this second measuring step, and the changed positions of the contact points 220 lead to a different spread and thus a new distribution of the detectable weight portions at the three support elements 210. Such a second measurement step can be used in particular to identify randomly occurring, counteracting effects.

This could be, for example, an increase in the weight of one subset of workpieces 150 with a simultaneous decrease in the weight of another subset of workpieces 150, resulting in no or insignificant displacement of the actual center of gravity 238 due to symmetry of the support elements 210 and symmetry of the group of workpieces 150. This case is also not improbable because, for example, the closure in subregions of the suction tool 510 during the accumulation of starting material leads to an increased suction of starting material in other subregions of the suction tool 510 if the subregions are pneumatically connected via a common interior space or internal channels.

Figure 5:
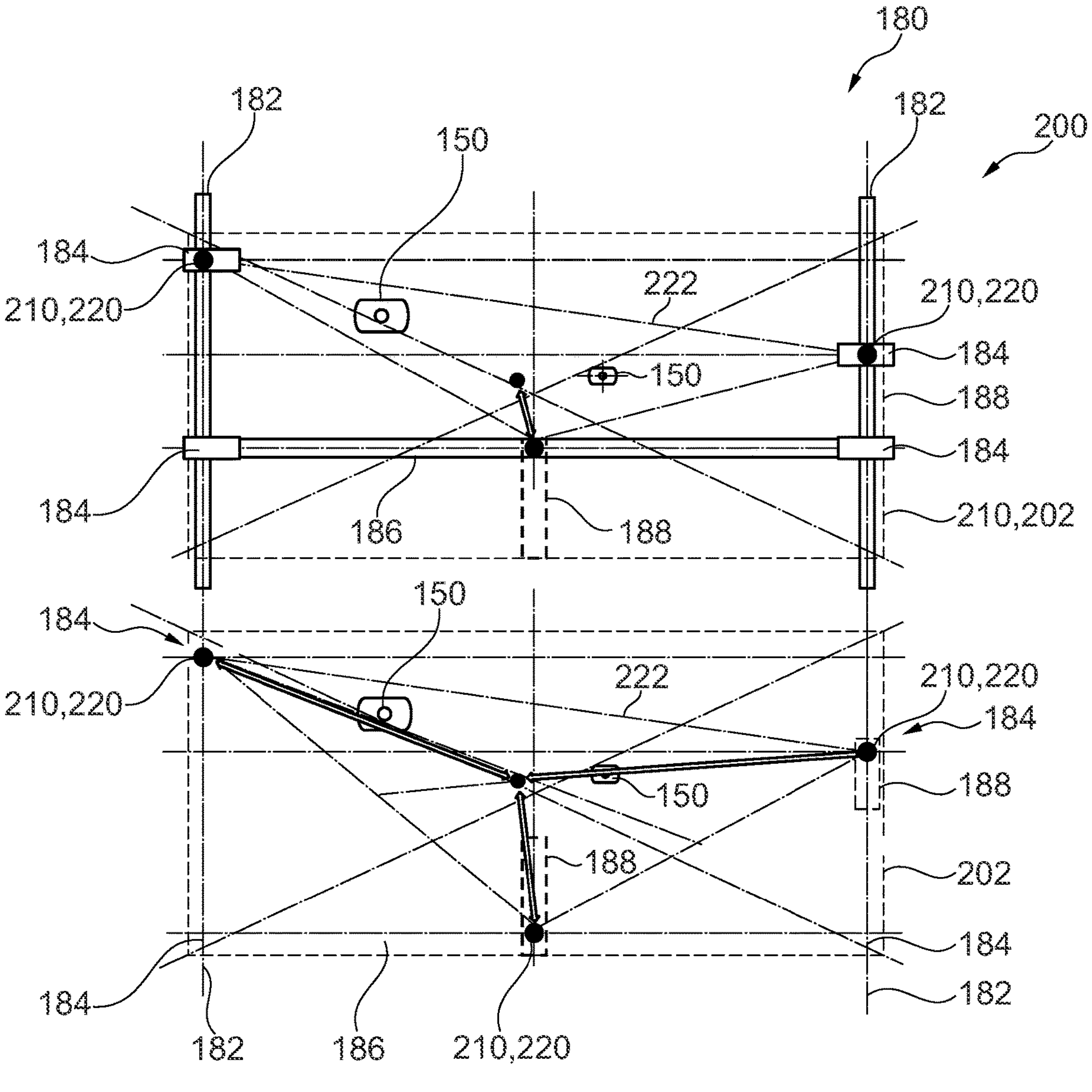
FIG. 5 shows the weighing system in a fourth embodiment.

FIG. 5 shows an embodiment in which the scale 200 is supported and driven by a linear drive 180, or the scale 200 is also formed or completed by components of the linear drive 180. The linear actuator has four individual movers 184 that are guided and driven for movement on drive rails 182 that are parallel to one another. The movers 184 are at the same time the support elements 210 of the scale 200 or support the support elements 210, wherein the contact points 220 with the carrier element 202 are given in an analogous manner as described above. The carrier element 202 is designed as a conveyor tray. Similar to FIG. 3 or 4, the carrier element 202 is supported by three support elements 210 over which the weight fractions are measured, and together they form a triangular contact pattern 222. Two of the movers 184 have a single support element 210, and a pair of movers 184 are rigidly connected by a carrier element 186, at the center of which is the third support element 210. The scale 200 is thus designed and usable as a static scale 200, wherein the weighing step the workpieces 150 are not moved and the workpieces 150 and/or are moved at least some of the time, wherein the workpieces 150 have no relative velocity to the scale 200.

The movers 184 can be driven in different ways, whereby in an advantageous embodiment, which is given here as an alternative, the linear drive 180 is an electromagnetic linear drive 180, which is formed, for example, as a vertically formed oval track on two parallel tracks. The movers 184 can be controlled independently of one another. In the shown embodiment example of the two partial images of FIG. 5, the support element 210 shown on the upper left is in a fixed positioning below the carrier element 202. The right, middle support element 210 and the lower, central support element 210 are both supported and guided in parallel guide cams 188, which are also arranged below the carrier element 202, so that the relative position of the support elements 210 to each other can be changed.

Figure 6:
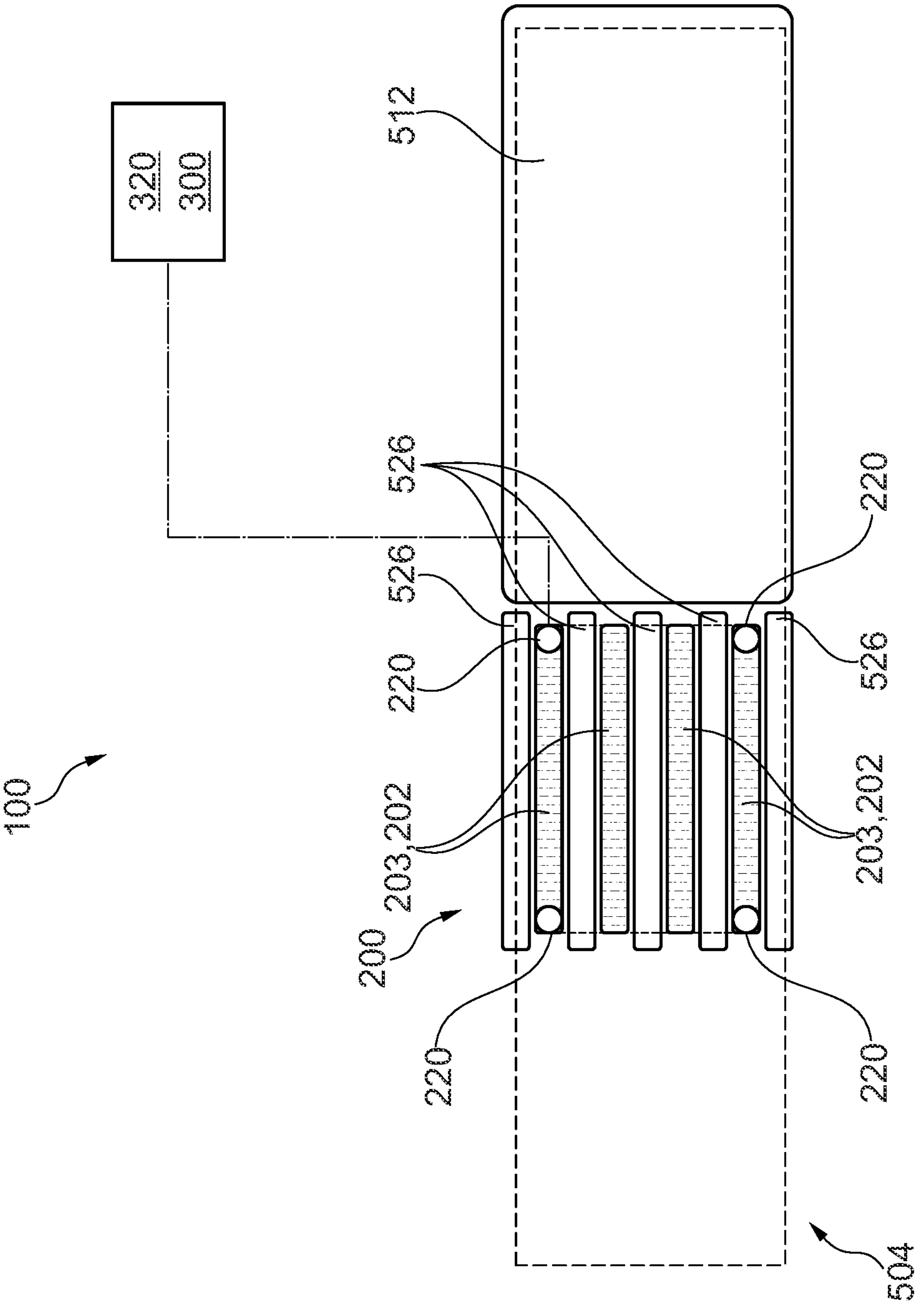
FIG. 6 shows the weighing system in another example embodiment.

In the embodiment example of FIG. 6, the scale 200 of the weighing system 100 includes connected to a unit having the control unit 320 and the evaluation unit 300. Further, the transport element 202 of the scale 200 is formed by a plurality of transport rails 203 mounted on a common carrier element (not shown). In the example shown, the carrier element rests on four support elements 210. Between and to the side of the carrier rails 203 of the transport element 202 are five narrow conveyor belts 526, which can be driven individually or together. If workpieces 150 are ejected from forming unit 504 and positioned on scale 200 or an advancing transport means and transferred to transport element 202 of scale 200, weighing may occur in the weighing step as described in advance. In an alternative embodiment, the transport rails 203 or the entire transport element 202 are mounted so as to be movable in the vertical direction and/or the individual or the entire group of narrow conveyor belts 526 are mounted so as to be movable in the vertical direction so that the workpieces 150 can be moved out of contact with the narrow conveyor belts 526. In this manner, the influence of a conveyor belt can be prevented during the weighing step.

The group of narrow conveyor belts 526 may be a part of the rejection unit 512, a part of the scale 200, and/or a part of some other adjacent unit, such as the forming unit 504 or the finishing unit 522.

Figure 7:
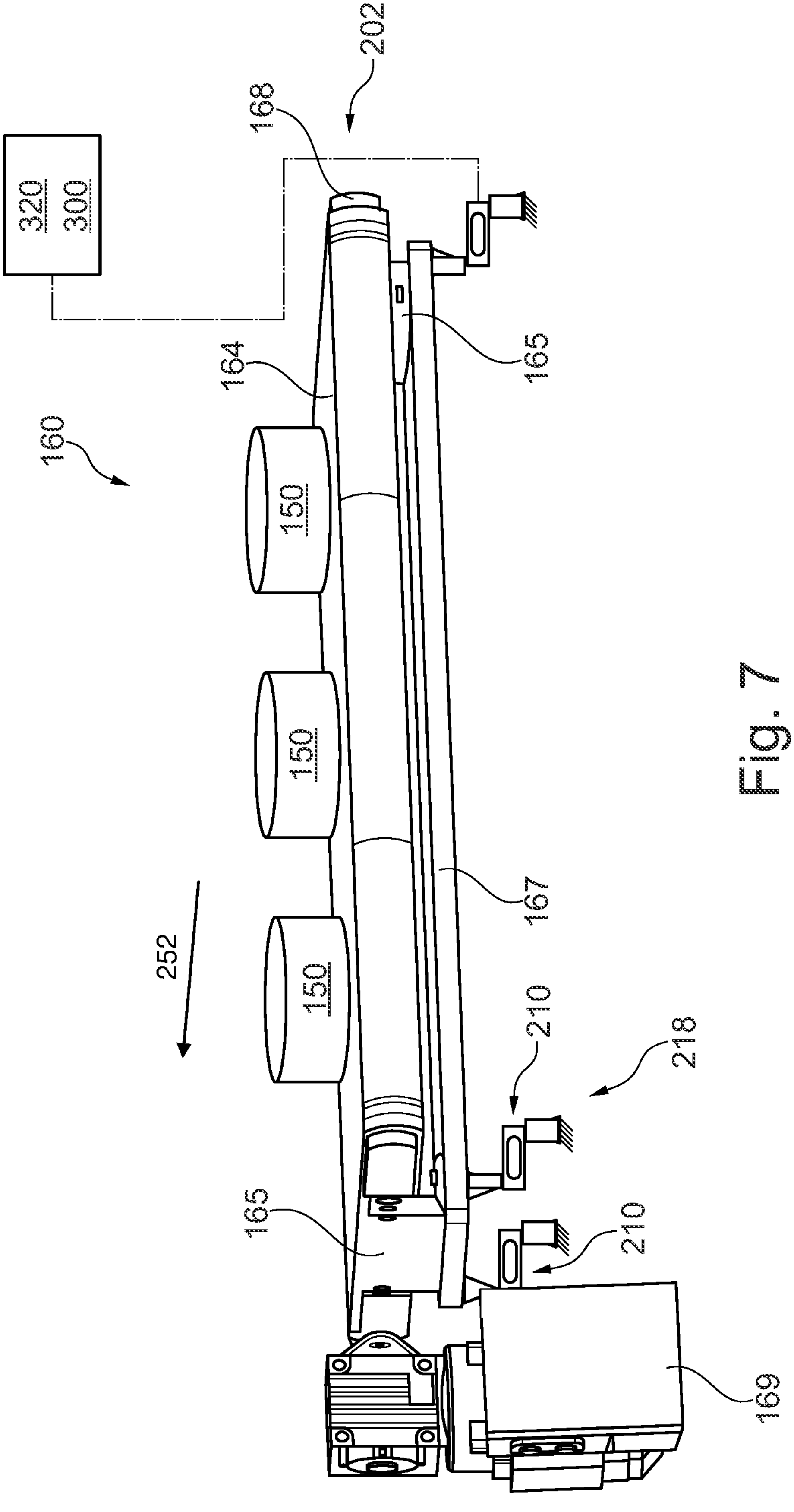
FIG. 7 shows the weighing system in a fifth embodiment.

In the embodiment example of FIG. 7, the scale 200 is designed as a conveyor unit 160 or is integrated in a conveyor unit 160 in that the carrier element 202 is formed from a plate-like carrier 167 which has lateral holding sections 165 to which a conveyor belt 164, which can be endlessly circulated and driven by means of a motor 169 and has two deflection rollers 168, is attached in a floating manner. In the weighing step, the workpieces 150 standing on or transported by the belt are weighed together with the carrier element 202 and the conveyor belt 164, as explained herein. In an alternative embodiment, the carrier may, for example, have or be connected to displaceably mounted support elements 210 analogous to FIG. 2. Furthermore, the scale 200 is connected in an analog manner to a control unit 320 and/or an evaluation unit 300.

Figure 8:
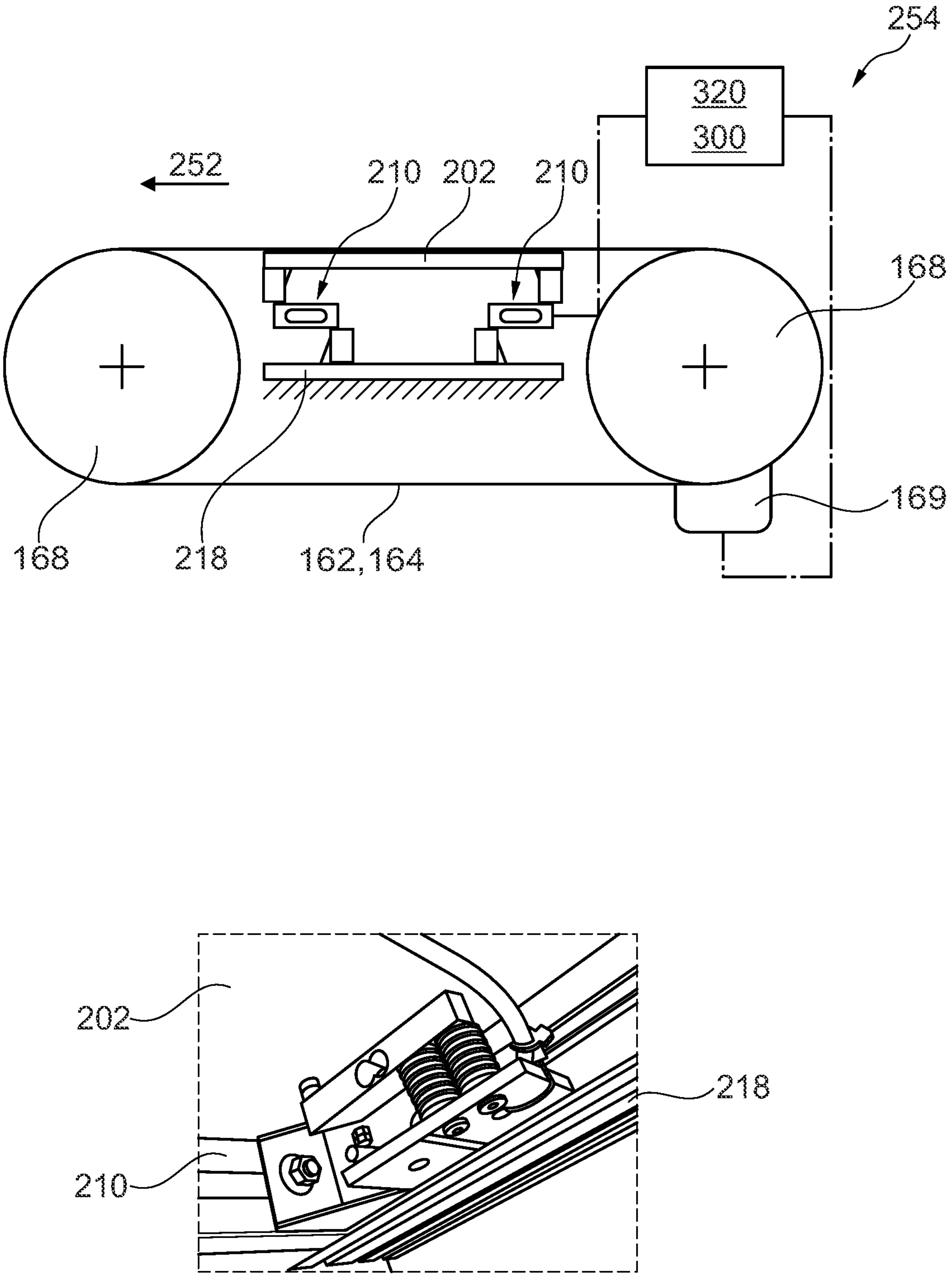
FIG. 8 shows the weighing system in a sixth embodiment.

FIG. 8 shows an embodiment example in two partial images, in that the carrier elements 202 of the scale 200 are arranged between the forward run (upper run) and the return run (lower run) of a conveyor belt 164. The upper partial image shows a vertical section and the lower partial image shows a bottom view of the carrier element 202 and the support element 210 there. In this embodiment, the upper belt layer (upper run) rests on the carrier element 202 and is weighed together with the respective workpieces 150 in the weighing step, whereby it can be provided that at least one deflection roller 168 is mounted so that it can be moved for belt tensioning.

Here, the scale 200 and the conveyor 164 may be attached to a common support structure, or the scale 200 may be attached to its own carrier structure 218, as in the example shown.

LIST OF REFERENCE SIGNS

100 Weighing system
140 Starting material
142 Vacuum pump
150 Workpiece, product
152 Workpiece stack, product stack
154 Support surface
160 Conveyor unit
162 Conveyor
164 Conveyor belt
165 Holding section
166 Band position
167 Beams
168 Deflection roller
169 Engine
180 Linear actuator
182 Drive rail
184 Mover
186 Carrier element
188 Guide curves
200 Scale
202 Carrier element
203 Carrier rail
210 Support element
216 Referencing
218 Carrier structure
220 Contact point
222 Contact pattern
230 Focus of 202
232 Focus of 228
234 Shear point of 150
235 Center of gravity, resulting
236 Target focus
238 Actual focus
252 Main transport direction
254 Control loop
300 Evaluation unit
302 Input interface
304 Data line
310 Sensor unit
312 Sensor, 3D laser scanner
314 Sensor, thermal imaging camera
320 Control unit
500 Manufacturing device
502 Material feed unit
504 Forming unit
506 Forming station, first
508 Forming station, second
510 Suction tool
512 Rejection unit
516 Forming tool
518 Preform station
520 Feed tank
522 Finishing unit
524 Motion unit
526 Conveyor belt

The invention claimed is:

1. A weighing system for a manufacturing device for products, comprising at least one electronically evaluable scale, comprising at least one carrier element for positioning a group of horizontally adjacent workpieces or horizontally adjacent workpiece stacks, and an evaluation unit connected to the scale, for receiving and utilizing detected weighing data, wherein the scale, in cooperation with the evaluation unit, is operable to detect a total weight and a horizontal weight distribution of the group of horizontally adjacent workpieces or horizontally adjacent workpiece stacks deposited on the carrier element, and wherein the scale in cooperation with the evaluation unit is operable to quantify and differentiate as weight distribution a respective individual weight of at least two workpieces and/or workpiece stacks adjacent to one another in the group of horizontally adjacent workpieces or horizontally adjacent workpiece stacks, wherein the scale comprises at least three support elements for the at least one carrier element, wherein the at least three support elements comprise force measuring sensors, wherein the at least three support elements are connected to the at least one carrier element in a contact pattern with three contact points that are not in a row, and wherein the at least three support elements and/or their force measuring sensors are operable to send measured values to the evaluation unit, the evaluation unit being configured to determine the total weight and the horizontal weight distribution based thereon.

2. The weighing system according to claim 1, wherein the weighing system has one or two carrier columns directly or indirectly supporting the carrier element for depositing, which each have at least one torsion sensor for at least partially determining the horizontal weight distribution.

3. The weighing system according to claim 1, wherein the evaluation unit comprises at least one input interface for receiving sensor data and/or production data, wherein:

the sensor data comprise recorded, geometric measured values and the production data define nominal values of at least one workpiece or at least one workpiece stack.

4. The weighing system according to claim 1, wherein a further scale is comprised, which is connected to the evaluation unit, wherein the further scale has a different arrangement of at least one carrier column or a different contact pattern of the at least three support elements.

5. The weighing system according to claim 1, wherein the at least one scale is integrated into a conveyor unit, the conveyor unit comprising:

a conveyor belt, wherein the scale is integrated into the conveyor belt in such a manner that the carrier element is covered by at least one belt layer;

and/or comprises a conveying device by which the scale can be at least partially transported.

6. The weighing system according to claim 1, wherein the at least one scale:

-is operable as a dynamic scale and comprises corresponding components in order to carry out a dynamic measurement, the workpieces being conveyed relative to the scale during the dynamic measurement, and/or is operable as a static balance and comprises corresponding components in order to carry out a static measurement, the workpieces standing relative to a balance during the static measurement and not being conveyed in order to carry out the static measurement.

7. The weighing system according to claim 1, wherein:

at least one support element is displaceably mounted and drivable relative to the carrier element; and/or the carrier element is displaceably mounted and drivable relative to at least one support element.

8. The weighing system according to claim 1, wherein the scale is arranged on or formed by an electromagnetic direct drive having at least one drive rail and at least two independently drivable and controllable movers, wherein:

at least a first mover or a first drive unit has at least one support element, and at least one further mover or a further drive unit comprises at least one further support element.

9. A manufacturing device for workpieces, comprising a material feed unit, a forming unit and a rejection unit, wherein the forming unit has at least one forming station with at least one forming tool and at least one pressing device, wherein the at least one forming tool is held on the pressing device and is movable by the pressing device in a motor-driven manner, and wherein at least one control unit is provided to control and/or regulate at least one unit and/or one device, wherein a weighing system for determining weighing data of at least one workpiece and/or at least one workpiece stack is comprised, wherein the weighing system is arranged in the forming unit and/or after the forming unit;

wherein the weighing system comprises a scale, at least one carrier element for positioning a group of horizontally adjacent workpieces or horizontally adjacent workpiece stacks, and an evaluation unit connected to the scale, for receiving and utilizing detected weighing data; and wherein the scale comprises at least three support elements for the at least one carrier element, wherein the at least three support elements comprise force measuring sensors, wherein the at least three support elements are connected to the at least one carrier element in a contact pattern with three contact points that are not in a row, and wherein the at least three support elements and/or their force measuring sensors are operable to send measured values to the evaluation unit, the evaluation unit being configured to determine a total weight and a horizontal weight distribution based thereon.

10. The manufacturing device according to claim 9, wherein the at least one forming station and/or its at least one forming tool:

is operable for press-forming workpieces from a starting material; and/or is operable for the pressing and hot forming of workpieces from the starting material and/or a preform of a workpiece.

11. The manufacturing device according to claim 9, wherein the weighing system comprises the scale having downstream of the at least one forming tool for press forming workpieces and arranged downstream of the forming tool for press and hot forming workpieces.

12. The manufacturing device according to claim 9, wherein the evaluation unit is connected to the at least one control unit in a data-conducting manner, is functionally operable and interacts in such a manner that the control unit is configured to control and/or regulate at least one unit and/or one device at least temporarily based on the weighing data obtained from the evaluation unit.

13. The manufacturing device according to claim 9, wherein at least one forming station and/or at least one forming tool is adapted to form a group of two or more workpieces and comprises and/or is adapted to release and/or hold individual workpieces and/or groups of workpieces in a controlled manner.

14. A method of operating a manufacturing device, comprising the steps of:

provisioning a starting material introducing the starting material into a forming unit, the forming unit having at least one forming station with at least one forming tool and at least one pressing device, forming at least one workpiece using the at least one forming tool, wherein downstream of the forming station, a total weight and a horizontal weight distribution of at least one workpiece or workpiece stack positioned on a carrier element is detected by a scale of a weighing system; and wherein the scale comprises at least three support elements for the carrier element, wherein the at least three support elements comprise force measuring sensors, wherein the at least three support elements are connected to the carrier element in a contact pattern with three contact points that are not in a row, and wherein the at least three support elements and/or their force measuring sensors send measured values to an evaluation unit, the evaluation unit determining the total weight and the horizontal weight distribution based thereon.

15. The method according to claim 14, wherein after forming of at least two workpieces, a stepwise weighing for a number of workpiece layers greater than or equal to 2 is performed.

16. The method according to claim 14, wherein after forming of a group of at least two workpieces, a multiple weighing is performed before a next forming of a next group of workpieces by independently weighing a partial number of workpieces of a jointly formed group in partial weightings.

17. The method according to claim 16, wherein the total weight and the horizontal weight distribution are detected after the forming and a further forming.

18. The method according to claim 16, wherein:

weighing data for the total weight and the horizontal weight distribution are determined and passed to the evaluation unit, the evaluation unit passing the weighing data to a control unit and, based on the weighing data and use and/or integration of setpoint value specifications, the method includes at least controlling and/or regulating, at least temporarily, an aggregate and/or a device; and/or sending a notification and/or warning signal to an output unit an optical or acoustic signal generator.

19. The weighing system according to claim 1, wherein the workpieces are fiber material workpieces.

* * * * *